(12) United States Patent
Baloche et al.

(10) Patent No.: US 7,790,821 B2
(45) Date of Patent: Sep. 7, 2010

(54) DISPERSIONS OF ACRYLIC POLYMER LATEX AS ADDITIVES FOR THE INHIBITION OF THE DEPOSITION OF PARAFFINS IN CRUDE OILS AND COMPOSITIONS THAT CONTAIN THEM

(75) Inventors: Alain Baloche, Annay (FR); Didier Juhue, Chaponost (FR); Philippe Picard, Saint Genis Laval (FR); Tong Eak Pou, Courdimanche (FR); Caroline Truszkowski, Paris (FR)

(73) Assignee: Atofina, Paris la Defense Cedex (FR)

( * ) Notice: Subject to any disclaimer, the term of this patent is extended or adjusted under 35 U.S.C. 154(b) by 0 days.

(21) Appl. No.: 11/802,716

(22) Filed: May 24, 2007

(65) Prior Publication Data

US 2007/0244239 A1      Oct. 18, 2007

Related U.S. Application Data

(60) Division of application No. 11/334,350, filed on Jan. 19, 2006, now abandoned, which is a continuation of application No. 10/486,655, filed on Nov. 3, 2004, now abandoned.

(30) Foreign Application Priority Data

Aug. 8, 2001    (FR) .................................. 01 10591

(51) Int. Cl.
C08F 4/28 (2006.01)
C08F 20/06 (2006.01)
C08F 20/10 (2006.01)
C08F 118/02 (2006.01)

(52) U.S. Cl. .................. 526/227; 526/317.1; 526/318; 526/319

(58) Field of Classification Search ............... 526/227, 526/317.1, 318, 319
See application file for complete search history.

(56) References Cited

U.S. PATENT DOCUMENTS 2,917,496 A  *  12/1959   Honn ......................... 526/252
4,110,283 A        8/1978   Capelle
5,418,278 A  *   5/1995   Ritter et al. ................. 524/556

FOREIGN PATENT DOCUMENTS

| EP | 0 448 166 |    | 9/1991 |
| EP | 0 448 166 A2 | * | 9/1991 |
| WO | WO 97 34940 |    | 9/1997 |

* cited by examiner

Primary Examiner—William K Cheung
(74) Attorney, Agent, or Firm—Millen, White, Zelano, Branigan, P.C.

(57) ABSTRACT

This invention relates to latex dispersions that are based on (co)polymers with one or more n-alkyl(meth)acrylate monomers with n a varying from 6 to 40, and optionally one or more monomers that are not very water-soluble of the (meth) acrylic and/or vinyl type, optionally one or more polar monomers that are selected from among the (meth)acrylamides and their derivatives and optionally one or more monomers that are selected from among the ethylenically unsaturated monocarboxylic and/or dicarboxylic acids or anhydrides.

These dispersions are obtained by radical-type emulsion polymerization in the presence of water.

They can be used as is for the inhibition of the deposition of paraffins that are contained in the crude petroleum hydrocarbons or else diluted in one or more solvents.

21 Claims, No Drawings

DISPERSIONS OF ACRYLIC POLYMER LATEX AS ADDITIVES FOR THE INHIBITION OF THE DEPOSITION OF PARAFFINS IN CRUDE OILS AND COMPOSITIONS THAT CONTAIN THEM

This application is a divisional application of U.S. application Ser. No. 11/334,350 filed Jan. 19, 2006, now abandoned which is a continuation of U.S. application Ser. No. 10/486,655 filed Nov. 3, 2004, now abandoned, claiming the benefit of French application serial number 01.10591 filed Aug. 8, 2001 and PCT application 19202/02786 filed Aug. 2, 2002.

TECHNICAL FIELD

The technical field of this invention is that of crude petroleum hydrocarbons and additives that are intended to improve their conditions of use.

The crude petroleum hydrocarbons can contain significant paraffin fractions, of which the amount and the exact nature are variable according to the extraction fields. At well temperature, the paraffins are liquid and dissolved in the crude oil. During the oil's rise to the surface, its temperature drops, and the paraffins, by crystallizing, form a three-dimensional grid of needles and flakes. This results in a loss of fluidity that makes the production, the transport, the storage and even the treatment of these oils very difficult. The clogging in the pipelines and treatment equipment is frequent.

PRIOR ART

Numerous processes have been proposed to solve this problem, such as mechanical scraping or even heating the walls. These processes are expensive and their implementation is not always possible.

To improve the rheology of the crude oils, SHELL has acted as a pioneer: In FR 1,575,984, it teaches that macromolecular "comb"-type compounds that are constructed on the model of a main hydrocarbon-containing chain on which are grafted lateral chains that themselves contain quite long hydrocarbons, i.e., at least 14 carbon atoms and 30 carbon atoms at most, can disturb the crystallization of heavy paraffins. This property duly develops in macromolecules whose mean molecular mass is between 1,000 and 1,000,000, and preferably between 4,000 and 100,000.

The prior art then suggested the use of additives, most often polymers whose role is to delay or to modify the crystallization of paraffins and thereby to improve the oil flow properties and to prevent the agglomeration of crystals that are formed on the walls.

Many works then tried to improve the efficiency of these first polymer-type additives either by synthesis or by formulation so as to adapt them to the various types of crude oils encountered and to successively remedy the difficulties of synthesis and/or manipulation of various generations of products. For example, FR 2,746,400 in the name of the applicant teaches that comb-type macromolecular compounds that combine two comb distribution types provide unexpected synergies in terms of reducing the pour point of crude petroleum hydrocarbons. In GB 2,305,185 and EP 673,990, SHELL shows the advantage of combining small amounts of polar monomers in co-polymerization with the n-alkyl (meth)acrylates that are conventionally used by one skilled in the art.

All of these polymers are generally synthesized by radical-type polymerization in solution in organic solvents such as toluene, xylene and hydrocarbons in general, to a mass concentration of 10 to 60%, preferably 30 to 50%. Although effective in most of the crude oils at low rates that range from 20 to 1,000 ppm, preferably from 100 to 500 ppm, these products represent the major drawback of being solid below 30° C. Their use on site therefore requires their advance heating or their dilution in a solvent, for example their synthesis solvent, up to mass concentrations that are less than 10% according to the type of compound and according to the temperature of use. This has the consequence of increasing transport and/or operating costs of this type of additive.

To obtain concentrated and liquid products over a wide range of temperatures, solutions have already been proposed:

Thus, SHELL in EP 448,166, then WO 98/51731 and British Petroleum in WO 98/33846 teach the emulsion in water of a mixture of n-alkyl acrylate copolymers in the presence of surfactant(s) and/or surfactant polymers with a high-pressure homogenizer. Such a preparation process exhibits the drawback of being not very economical industrially because it requires two preparation stages as well as the use of a specific emulsification material.

U.S. Pat. No. 5,418,278 or EP 359,061 of HENKEL proposes resolving a portion of these drawbacks by emulsions that can reach 30 to 50% of dry extract that contains n-alkyl acrylate copolymers and unsaturated ethylene derivatives of carboxylic acid or anhydride in the presence of a surfactant.

The major drawback of such a solution resides in the fact that to be stable, the emulsion should contain a large amount of acid or anhydride, which not only can interfere with the overall performance of the product but also limits its use with particular crude oils.

SPECIFICATION OF THE INVENTION

This invention proposes dispersions of acrylic copolymer latex with a variable composition that are particularly suited for the reduction of the pour point of the crude petroleum hydrocarbons.

These dispersions have the advantage of being stable, concentrated and liquid over a wide range of temperatures, in particular close to ambient temperature. When they are used to ensure the inhibition of the deposition of paraffins in crude oils, they do not require any additive for their incorporation into the crude oils.

The latex dispersions of this invention comprise at least 100 parts by weight of components (1) to (4) below:

(1) 5 to 70, preferably 5 to 58, and advantageously 5 to 50 parts by weight of one or more (co)polymers, whose units come from:

A—50 to 100%, preferably 70 to 100%, by weight of one or more monomers of n-alkyl (meth)acrylate type, with n a variant of 6 to 40, preferably 14 to 30, B—0 to 50%, preferably 0 to 30%, by weight of one or more monomers that are not very water-soluble (solubility of less than 5% at 20° C.) of (meth)acrylic type and/or vinyl type selected from among the n-alkyl (meth)acrylates with n less than or equal to 6, but also 2-ethyl hexyl (meth)acrylate, vinyl acetate, vinyl propionate, vinyl butyrate, vinyl versatates, vinyl pivalate, vinyl laurate, and vinyl-aromatic monomers that are selected from among styrene and its derivatives, such as α-methyl styrene, C—0 to 50%, preferably 0 to 30%, by weight of one or more polar monomers that are selected from among the (meth)acrylamides and their derivatives, such as N-ethylolacrylamide, dialkylaminoethyl(meth)acrylates, the monoolefinic derivatives of sulfonic acid and phosphoric acid such as acrylamidomethyl propane sulfonic acid, N-vinylpyrrolidone, vinylpyridine and its derivatives, and hydroxyalkyl (meth)acrylates, D—either 0 to 0.5% by weight of one or more monomers that are selected from among the ethylenically unsaturated moncarboxylic and/or dicarboxylic acids or anhydrides when C=0%, or up to 40% by weight of one or more monomers that are selected from among the ethylenically unsaturated monocarboxylic and/or dicarboxylic acids or anhydrides when C≠0%.

(2) 0 to 30 parts by weight of a co-solvent or a mixture of co-solvents, preferably 5 to 25, and advantageously 5 to 20, parts by weight, selected from among the ketones such as methylethylketone or methylisobutylketone, the aromatic solvents such as toluene, xylene and the mixtures of aromatic hydrocarbons, the alcohols such as butanol or isopropanol, the glycols and polyglycol ethers such as ethylene or propylene glycol, diethylene glycol or dipropylene glycol. Preferably, monomethyl or ethyl ether propylene or dipropylene glycol is selected.

(3) 0.1 to 10, preferably 0.1 to 8, and advantageously 0.5 to 5, parts by weight of one or more surfactants (ionic surfactants and/or nonionic surfactants and/or protective colloids such as polyvinyl alcohols and/or amphiphilic polymers that are selected from among the sulfates or sulfonates of fatty alcohols or alkylphenol, but also the alkylbenzene sulfonates and sulfosuccinates, the quaternary ammonium salts such as dimethyldialkylammonium chlorides and ethoxylated fatty alcohols).

(4) water (sufficient quantity for 100: the sum of constituents (1) to (4) that represents 100 parts by weight)

and optionally other components, in particular polymerization additives and/or their residues (initiating agents, buffering agents, transfer agents), and surfactants with a low hydrophilic-lipophilic balance.

Among the dispersions that comprise as co-solvent(s) at least one or more liquid polyols, those whose amount of water represents more than 40 and advantageously more than 50% by weight of solid polyol(s) are preferred.

Advantageously, the dispersions according to the invention that comprise
(1) about 30 to about 35 parts by weight of (co)polymer(s),
(2) about 14 to about 18 parts by weight of co-solvents, for the most part based on liquid polyol(s),
(3) about 1 to about 4 parts by weight of surfactants,
(4) the addition to 100 parts by weight of water, as well as at least one initiating agent, at least one transfer agent, and at least one buffering agent, are preferred.

The latex dispersions according to the invention are obtained by a process for emulsion polymerization in water in the presence of surfactant(s) and optionally in the presence of co-solvent(s).

The radical-type polymerization in emulsion is conducted in a standard manner in a device that is known for polymerizations in emulsion according to a batch process, semi-batch process or continuous process. The scope of the invention would not be exceeded by using a Manton-Gaulin-type high-pressure emulsifier or by using an ultrasound technique to emulsify the mixture before polymerization and to adopt a so-called mini-emulsion or mini-dispersion process so as to reduce the amounts of organic co-solvents and surfactants.

Initiating agents are used that produce free radicals that are selected from among the usual peroxides, such as the persulfates, for example potassium or ammonium persulfate, the organic hydroperoxides and peroxides, hydrogen peroxide, peracids, the diazo compounds, for example 4,4' azobis(4-cyanopentanoic) acid or 2,2' azobis (2-amidinopropane) hydrochloride. In some cases, it is possible to have recourse to a redox system, for example ammonium persulfate that is combined with sodium metabisulfite to work at a lower temperature.

The polymerization reaction can be conducted over a temperature range of 20 to 90° C. for 0.5 to 4 hours according to the initiating conditions selected.

Buffering agents, such as, for example, sodium tetraborate, and transfer agents, such as, for example, alkyl mercaptans, can be useful in the polymerization and in the final properties of the product. The performance level of the products of the invention can also be improved in particular by the post-addition of the organic solvents cited above, but also surfactants that are also cited with, in addition, those of low HLB (used to ensure hydrophilic-lipophilic balance), preferably less than or equal to 5, such as the fatty sorbitan esters.

The performance levels of the products according to the invention have been assessed thanks to the measurement of the pour point according to the ASTM D97 standard that consists in adding the crude oil that is brought to a temperature that is higher than its pour point, with a defined amount of additive for the inhibition of the deposition of paraffin, then in cooling the crude in stages of 3° C., whereby the pour point represents the temperature starting from which the crude oil no longer flows.

In the examples below, a HERZOG MP852 device was used, whose detection of the flow is ensured by an LCD camera.

All of the additives for inhibition of the deposition of paraffins have been tested in an Itteville crude oil whose pour point that is measured according to this method is 12° C.

EXAMPLE 1

Into a one-liter, double-wall reactor that is equipped with a stirring mechanism, a thermometer, a reflux condenser, a nitrogen intake and a bath that is thermostated to 50° C., 220 g of demineralized water, 2 g of sodium tetraborate (Borax), 80 g of monomethyl ether dipropylene glycol that is marketed by Dow Chemical under the name Dowanol DPM, and 10 g of sodium bistridecyl sulfosuccinate that is marketed by Cytec under the name Aerosol TR70 are introduced.

Once the temperature of 50° C. is reached by the medium, a mixture of 169 g of behenyl acrylate that is marketed by Atofina under the name Norsocryl A 18-22 and 0.5 g of n-dodecyl mercaptan, previously melted at 50° C., are added, and the mixture is brought to 80° C.

Then, within one minute, a solution of 1 g of potassium persulfate is introduced into 20 g of demineralized water.

After the exothermy peak, the reaction is allowed to take place for 2 hours, then it is cooled to ambient temperature.

After filtration on a 100 μm filter, a stable latex dispersion is obtained with about 35% dry extract.

The latex dispersion that is thus obtained and that is named S1 is used as is.

COMPARISON EXAMPLE 1

Into a one-liter, double-wall reactor that is equipped with a stirring mechanism, a thermometer, a reflux condenser, a nitrogen intake and a bath that is thermostated to 50° C., 435 g of a fraction of aromatic hydrocarbons with a boiling point of 180-200° C. (Solvesso 150) and 553 g of behenyl acrylate that is marketed by Atofina under the name Norsocryl A18-22 are introduced. The medium is brought to 105° C., and within one hour, 3.8 g of t-butyl perbenzoate that is marketed by Atofina under the name Trigonox C in solution in 12 g of a fraction of aromatic hydrocarbons with a boiling point of 180-200° C. (Solvesso 150) is added.

The medium is then kept for 2 hours at 105° C. to ensure the complete conversion of the acrylic monomer.

After cooling to 50° C., a concentrated solution with 55% of an acrylic homopolymer is obtained. The product is solid below 28° C.

EXAMPLE 2

By way of comparison, a solution with 5.5% of the product that is obtained in Comparison Example 1 in its aromatic synthesis solvent that will be called S2 is prepared. This dilution operation is essential for implementing the product, taking into account its solidification point.

Solutions S1 and S2 are respectively added to the Itteville crude at variable concentrations, and pour points (PE) of the crude oils that are thus added are measured according to the method that is described above. The table below lists the values of the pour point that are expressed in ° C.

|  | Concentration* (ppm) | | | |
| --- | --- | --- | --- | --- |
|  | 0 | 100 | 200 | 500 |
| PE (S1) | 12 | −12 | −18 | −27 |
| PE (S2) | 12 | −9 | −9 | −15 |

*The concentration is expressed in equivalent terms of the product of Comparison Example 1 with 55% dry extract. It clearly appears that dispersion S1 is a very effective additive for lowering the pour point of the Itteville crude oil without requiring any dilution for its use.

EXAMPLE 3

The procedure is performed according to the operating mode that is described in Example 1, but by eliminating the monomethyl ether dipropylene glycol and by replacing a portion of the 169 g of behenyl acrylate by 25 g of N-vinyl pyrrolidone.

The latex dispersion that is thus obtained as is, named S3, is used to add the Itteville crude. The table below lists the values of the pour point expressed in ° C.

|  | Concentration* (ppm) | |
| --- | --- | --- |
|  | 0 | 500 |
| PE (S3) | 12 | −18 |

*The concentration is expressed in equivalent terms of the production of Comparison Example 1 with 55% dry extract. It is noted that solution S3 according to the invention, added to the Itteville crude, lowers in particular the pour point as the table above shows.

EXAMPLE 4

Into a one-liter, double-wall reactor that is equipped with a stirring mechanism, a thermometer, a reflux condenser, a nitrogen intake and a bath that is thermostated to 50° C., 225 g of demineralized water, 81 g of Dowanol DPM, 18 g of Sc, 4 g of N-alkyl dimethyl benzyl ammonium chloride and 14 g of a mixture of ethoxylated fatty alcohols of HLB 15 are introduced.

Once the temperature of 50° C. is reached by the medium, a mixture of 169 g of Norsocryl A18-22 and 0.5 g of n-dodecyl mercaptan, previously melted at 50° C., is added, and the mixture is brought to 70° C.

Then, within one minute, a solution of 1 g of 2,2' azobis(2-amidinopropane)dihydrochloride in 20 g of demineralized water is introduced.

After the exothermy peak, the reaction is allowed to take place for 2 hours, then it is cooled to ambient temperature.

After filtration on a 100 µm filter, a stable latex dispersion is obtained with about 35% dry extract.

The latex dispersion that is thus obtained, named S4, is used as is in the Itteville crude oil.

|  | Concentration* (ppm) | |
| --- | --- | --- |
|  | 0 | 300 |
| PE (S4) | 12 | −12 |

*The concentration is expressed in equivalent terms of the product of Comparison Example 1 with 55% dry extract. It is noted that solution S4, added to the Itteville crude, reduces in particular the pour point.

EXAMPLE 5

The synthesis that is described in Example 1 is resumed, but during the cooling, 1.7 and 3.4 g respectively of a non-ionic surfactant of ethoxylated fatty alcohol-type (marketed by the CECA Company under the name Remcopal 10) are post-added to obtain solutions S5 and S6 respectively. The solidification points (PF) of these solutions have been measured in the same way as the pour points of the crude oils. The table below combines the values of the solidification points of S5 and S6 as well as that of solution S1:

|  | Product | | |
| --- | --- | --- | --- |
|  | S1 | S5 | S6 |
| PF (° C.) | 0 | −10 | −13 |

It is noted that the post-addition of a non-ionic surfactant makes it possible to improve significantly the low-temperature stability of the products of the invention.

The invention claimed is:

1. A process for preparing a stable latex dispersion comprising:
   (1) 5 to 70 parts by weight of one or more (co)polymers, whose units come from:
   A—50 to 100%, by weight of one or more monomers of n-alkyl (meth)acrylate, with n designating the number of carbon atoms in the alkyl and being 6 to 40,
   B—0 to 50%, by weight of one or more (meth)acrylic or vinyl monomers having a water solubility of less than 5% at 20° C. selected from n-alkyl (meth)acrylates with n less than or equal to 6,2-ethyl hexyl (meth)acrylate, vinyl acetate, vinyl propionate, vinyl butyrate, vinyl versatates, vinyl pivalate, vinyl laurate, and styrenes,
   C—0 to 50%, by weight of one or more polar monomers that are selected from (meth)acrylamides and their derivatives, N-methylolacrylamide, dialkylaminoethyl (meth)acrylates, the monoolefinic derivatives of sulfonic acid and phosphoric acid, acrylamidomethyl propane sulfonic acid, N-vinylpyrrolidone, vinylpyridine and its derivatives, and hydroxyalkyl (meth)acrylates, D—either 0 to less than 0.5% by weight of one or more monomers that are selected from ethylenically unsaturated monocarboxylic and/or dicarboxylic acids or anhydrides when C=0%, or up to 40% by weight of one or more monomers that are selected from ethylenically unsaturated monocarboxylic and/or dicarboxylic acids or anhydrides when C≠0%, (2) 0 to 30 parts by weight of a co-solvent or a mixture of co-solvents, parts by weight, selected from ketones, methylethylketone or methylisobutylketone, aromatic solvents, toluene, xylene and mixtures of aromatic hydrocarbons, alcohols, butanol or isopropanol, glycols and polyglycol ethers, ethylene or propylene glycol, diethylene glycol or dipropylene glycol, (3) 0.1 to 10, parts by weight of one or more surfactants (ionic surfactants and/or nonionic surfactants and/or protective colloids such as polyvinyl alcohols and/or amphiphilic polymers that are selected from sulfates or sulfonates of fatty alcohols or alkylphenol, alkylbenzene sulfonates and sulfosuccinates, quaternary ammonium salts, dimethyldialkylammonium chlorides and ethoxylated fatty alcohols), (4) water (sufficient quantity for 100), and optionally other components comprising initiating agents, buffering agents, transfer agents and surfactants with a low hydrophilic-lipophilic balance, and said process comprising conducting radical-type emulsion polymerization in water of the monomers in the presence of said surfactant(s) (3) to form a dispersion, and adding to the resultant dispersion at least one additional surfactant, which is a non-ionic surfactant, and wherein the radical-type emulsion polymerization is optionally carried out in the presence of one or more co-solvents.

2. A process according to claim 1, wherein the radical-type initiating agents are selected from peroxides, persulfates, organic hydroperoxides and peroxides, hydrogen peroxide, peracids, diazo compounds, 4,4'azobis(4-cyanopentanoic) acid, or 2,2-azobis(2-amidinopropane) hydrochloride or redox systems, or ammonium persulfate combined with sodium metabisulfite.

3. A process according to claim 1, wherein the polymerization reaction is conducted over a range of temperatures of from 20 to 90° C.

4. A process according to claim 1, wherein the polymerization is performed in the presence of at least one buffering agent and/or at least one transfer agent.

5. A process according to claim 1, comprising a post-addition of organic solvent(s), and/or surfactant(s) having an HLB that is less than or equal to 5.

6. A process according to claim 3, wherein the polymerization reaction is conducted for a period from 0.5 to 4 hours.

7. A process according to claim 4, wherein said at least one buffering agent is sodium tetraborate and/or said at least one transfer agent is an alkyl mercaptan.

8. A process according to claim 5, wherein said organic solvent(s), and/or surfactant(s) having an HLB that is less than or equal to 5 is a fatty sorbitan esters.

9. A process for preparing a stable latex dispersion comprising:

(1) 5 to 70 parts by weight of one or more (co)polymers, whose units come from:

A—50 to 100%, by weight of one or more monomers of n-alkyl (meth)acrylate, with n designating the number of carbon atoms in the alkyl and being 6 to 40, B—0 to 50%, by weight of one or more (meth)acrylic or vinyl monomers having a water solubility of less than 5% at 20° C. selected from n-alkyl (meth)acrylates with n less than or equal to 6, 2-ethyl hexyl (meth)acrylate, vinyl acetate, vinyl propionate, vinyl butyrate, vinyl versatates, vinyl pivalate, vinyl laurate, and styrenes, C—0 to 50%, by weight of one or more polar monomers that are selected from (meth)acrylamides and their derivatives, N-methylolacrylamide, dialkylaminoethyl (meth)acrylates, the monoolefinic derivatives of sulfonic acid and phosphoric acid, acrylamidomethyl propane sulfonic acid, N-vinylpyrrolidone, vinylpyridine and its derivatives, and hydroxyalkyl (meth)acrylates, D—either 0 to 0.5% by weight of one or more monomers that are selected from ethylenically unsaturated monocarboxylic and/or dicarboxylic acids or anhydrides when C=0%, or up to 40% by weight of one or more monomers that are selected from ethylenically unsaturated monocarboxylic and/or dicarboxylic acids or anhydrides when $C^1$ 0%, (2) 0 to 30 parts by weight of a co-solvent or a mixture of co-solvents, parts by weight, selected from ketones, methylethylketone or methylisobutylketone, aromatic solvents, toluene, xylene and mixtures of aromatic hydrocarbons, alcohols, butanol or isopropanol, glycols and polyglycol ethers, ethylene or propylene glycol, diethylene glycol or dipropylene glycol, (3) 0.1 to 10, parts by weight of one or more surfactants (ionic surfactants and/or nonionic surfactants and/or protective colloids such as polyvinyl alcohols and/or amphiphilic polymers that are selected from sulfates or sulfonates of fatty alcohols or alkylphenol, alkylbenzene sulfonates and sulfosuccinates, quaternary ammonium salts, dimethyldialkylammonium chlorides and ethoxylated fatty alcohols), (4) water (sufficient quantity for 100), and surfactants with a low hydrophilic-lipophilic balance, and optionally other components comprising initiating agents, buffering agents, transfer agents, and said process comprising conducting radical-type emulsion polymerization in water of the monomers in the presence of said surfactant(s) (3) and optionally in the presence of one or more co-solvents, to form a dispersion, and adding to the resultant dispersion at least one additional surfactant, which is a non-ionic surfactant, and wherein the radical-type emulsion polymerization is optionally carried out in the presence of one or more co-solvents, wherein the at least one additional non-ionic surfactant is added to the dispersion while the dispersion is cooling.

10. A process according to claim 1, wherein the stable latex dispersion is prepared free of an amount of acid or anhydride sufficient to interfere with the overall performance of the resultant latex dispersion and to limit the use thereof with at least one crude oil.

11. A process according to claim 1, wherein the radical type emulsion polymerization is conducted in a single stage.

12. A process according to claim 4, wherein the resultant stable latex dispersion comprises about: 30-35 parts by weight of (CO) polymer, about 14-18 parts by weight of cosolvent, and about 1 to 4 parts by weight of surfactant.

13. A process for preparing a latex dispersion comprising:

(1) 5 to 70 parts by weight of one or more (co)polymers, whose units come from:

A—50 to 100%, by weight of one or more monomers of n-alkyl (meth)acrylate, with n designating the number of carbon atoms in the alkyl and being 6 to 40, B—0 to 50%, by weight of one or more (meth)acrylic or vinyl monomers having a water solubility of less than 5% at 20° C. selected from n-alkyl (meth)acrylates with n less than or equal to 6,2-ethyl hexyl (meth)acrylate, vinyl acetate, vinyl propionate, vinyl butyrate, vinyl versatates, vinyl pivalate, vinyl laurate, and styrenes, C—0 to 50%, by weight of one or more polar monomers that are selected from (meth)acrylamides and their derivatives, N-methylolacrylamide, dialkylaminoethyl (meth)acrylates, the monoolefinic derivatives of sulfonic acid and phosphoric acid, acrylamidomethyl propane sulfonic acid, N-vinylpyrrolidone, vinylpyridine and its derivatives, and hydroxyalkyl (meth)acrylates, D—either 0 to less than 0.5% by weight of one or more monomers that are selected from ethylenically unsaturated monocarboxylic and/or dicarboxylic acids or anhydrides when C=0%, or up to 40% by weight of one or more monomers that are selected from ethylenically unsaturated monocarboxylic and/or dicarboxylic acids or anhydrides when C≠0%, (2) 0 to 30 parts by weight of a co-solvent or a mixture of co-solvents, parts by weight, selected from ketones, methylethylketone or methylisobutylketone, aromatic solvents, toluene, xylene and mixtures of aromatic hydrocarbons, alcohols, butanol or isopropanol, glycols and polyglycol ethers, ethylene or propylene glycol, diethylene glycol or dipropylene glycol, (3) 0.1 to 10, parts by weight of one or more surfactants (ionic surfactants and/or nonionic surfactants and/or protective colloids such as polyvinyl alcohols and/or amphiphilic polymers that are selected from sulfates or sulfonates of fatty alcohols or alkylphenol, alkylbenzene sulfonates and sulfosuccinates, quaternary ammonium salts, dimethyldialkylammonium chlorides and ethoxylated fatty alcohols), (4) water (sufficient quantity for 100), and optionally other components comprising initiating agents, buffering agents, transfer agents and surfactants with a low hydrophilic-lipophilic balance, wherein at least one additional surfactant, which is a non-ionic surfactant, is optionally added to the dispersion after the dispersion is formed, said process comprising conducting radical-type emulsion polymerization in water of the monomers in the presence of surfactant(s) (3) and optionally in the presence of one or more co-solvents, wherein the polymerization is performed in the presence of at least one buffering agent and/or at least one transfer agent, wherein the stable latex dispersion is prepared free of an amount of acid or anhydride sufficient to interfere with the overall performance of the resultant latex dispersion and to limit the use thereof with at least one crude oil, and wherein the radical type emulsion polymerization is conducted in a single stage.

14. A process according to claim 13, wherein the resultant stable latex dispersion comprises about: 30-35 parts by weight of (CO) polymer, about 14-18 parts by weight of cosolvent, and about 1 to 4 parts by weight of surfactant.

15. A process according to claim 13, wherein at least one additional surfactant, which is a non-ionic surfactant, is added to the dispersion after the dispersion is formed.

16. A process according to claim 1, wherein the a latex dispersion comprises one or more polar monomers that are selected from (meth)acrylamides, N-methylolacrylamide, dialkylaminoethyl (meth)acrylates, acrylamidomethyl propane sulfonic acid, N-vinylpyrrolidone, vinylpyridine and hydroxyalkyl (meth)acrylates.

17. A process according to claim 13, wherein the a latex dispersion comprises one or more polar monomers that are selected from (meth)acrylamides, N-methylolacrylamide, dialkylaminoethyl (meth)acrylates, acrylamidomethyl propane sulfonic acid, N-vinylpyrrolidone, vinylpyridine and hydroxyalkyl (meth)acrylates.

18. A process according to claim 1, wherein the a latex dispersion comprises D—0% by weight of one or more monomers that are selected from ethylenically unsaturated monocarboxylic and/or dicarboxylic acids or anhydrides.

19. A process according to claim 13, wherein the a latex dispersion comprises D—0% by weight of one or more monomers that are selected from ethylenically unsaturated monocarboxylic and/or dicarboxylic acids or anhydrides.

20. A process according to claim 1, wherein C≠0%.

21. A process according to claim 13, wherein C≠0%.

* * * * *